United States Patent [19]

Miller

[11] 4,318,022

[45] Mar. 2, 1982

[54] END TURN AND TERMINAL SUPPORT FOR A STATOR ASSEMBLY

[75] Inventor: Sammy L. Miller, Bowling Green, Ky.

[73] Assignee: General Electric Company, Fort Wayne, Ind.

[21] Appl. No.: 140,760

[22] Filed: Apr. 16, 1980

Related U.S. Application Data

[62] Division of Ser. No. 844,915, Oct. 25, 1977, Pat. No. 4,215,464.

[51] Int. Cl.³ .............................................. H02K 3/46
[52] U.S. Cl. ...................................... 310/260; 310/71
[58] Field of Search .................. 310/71, 260, 194, 270

[56] References Cited

U.S. PATENT DOCUMENTS

| | | | |
|---|---|---|---|
| 3,457,442 | 7/1969 | Charlton et al. | 310/260 X |
| 3,748,510 | 7/1973 | McNeal | 310/71 |
| 3,912,957 | 10/1975 | Reynolds | 310/260 X |
| 4,219,748 | 8/1980 | Sakaguchi et al. | 310/260 X |

*Primary Examiner*—Mark O. Budd
*Attorney, Agent, or Firm*—Ralph E. Krisher, Jr.

[57] ABSTRACT

Dynamoelectric machine stator assemblies with new and improved winding interconnection arrangements are disclosed. Windings are disposed in slots of a magnetic core with end turn portions thereof disposed adjacent a core face. The winding end turn portions are compressed and shaped to receive and support a connection insulator. A connection insulator comprising a plurality of holsters contains tap wire connection points and is located within a deformed section at the outer peripheral surface of the winding end turns. The connection insulator is retained in position by a retention means and secured to the winding end turns by lacing material.

3 Claims, 8 Drawing Figures

END TURN AND TERMINAL SUPPORT FOR A STATOR ASSEMBLY

CROSS REFERENCE TO RELATED APPLICATION

This application is a division of my application Ser. No. 844,915, which was filed Oct. 25, 1977, now U.S. Pat. No. 4,215,464.

BACKGROUND OF THE INVENTION

This invention relates generally to dynamoelectric machine stator assemblies having insulated and mounted winding interconnections.

As is well known in the prior art, dynamoelectric machine stator assemblies such as motor stators comprise a magnetic core having a bore, axially extending slots, and windings comprising a plurality of coils formed by multiple turns of a conductor. The multiple winding turns have side turn portions which are disposed within the axial extending slots and end turn portions which project from the slots and are disposed about faces of the core. The windings are electrically connected to each other and external power conductor leads in various configurations. For example, the windings may be connected in parallel or in series, and interconnections may be made by brazing, soldering, or crimping. The connection points of these electrical interconnections are electrically insulated and disposed within or about the end turns of the windings.

In making interconnections within a stator assembly, the ultimate goal, of course, is to make interconnections which are reliable (that is, connections which are held secure, properly insulated, and which will not be subject to damage during subsequent assembly operations or during motor operation). In addition, it is often of extreme importance for many applications that connections must be made and insulated within the space requirements imposed pursuant to stator assembly mounting restrictions. It is known that interconnection points can be insulated by pulling or threading each conductor through an insulating sleeve until the connection point is disposed within the sleeve, for example, as disclosed in Reynolds U.S. Pat. No. 3,912,957, which issued Oct. 14, 1975, and which is assigned to the assignee of the present application. Sleeve type insulators are often secured by tucking or embedding the insulators within winding end turns. Problems are often created by such techniques of securing the insulators and connections due to the fact that burrs or sharp edges often exist at a connection point; thus, pushing or forcing insulators within the end turns can cause these burrs to cut through the insulator and into the insulation on the winding conductors causing a short circuit and motor failure. The likelihood of such a problem is especially acute in situations where a stator assembly is subjected to an operation wherein the winding end turns are shaped and compressed after the insulator or insulators have been embedded within the winding end turns. With connection insulators embedded within the winding end turns, more pressure must be exerted on the end turns in order to compress the end turns into a configuration conforming to mounting requirements; thus, the likelihood of damaging the connections is increased during the pressing operation.

Of course, it is known that such problems as cutting of insulation can be alleviated or eliminated by removing connection points from the winding end turns and mounting the connection points within insulators attached to the stator assembly core.

However, known prior art approaches for making and insulating electrical interconnections within a stator assembly and which involve insulator mounting out of the winding turns often require modification of existing stator assembly components such as additional mounting holes in the core or changes in slot insulation. In addition, some prior art approaches involving insulator mounting outside the winding end turns require insulators which cannot be used in circumstances where mounting space is at a premium. Further, known prior art approaches require that connections within an insulator be performed individually, that is, one at a time; thus, extending stator assembly time. Still further, prior art connection methods often require multiple insulating sections disposed around the face of the core, or else connections to a single insulator involve draping of wires about the end turns which is undesirable in many motor applications.

Accordingly, one of the objects of this invention is to provide new and improved assemblies for fabricating dynamoelectric machine stator assemblies which overcome the above-mentioned and other problems and deficiencies.

Another object of the present invention is to develop new and improved stator assemblies fabricating methods to reduce or eliminate motor failures resulting from winding interconnections.

Still another object of the present invention is to provide new and improved stator assemblies and, additionally, to provide winding interconnections that are readily accessible and securely mounted while minimizing connection insulator mounting space requirements.

Yet another object of the present invention is to provide new and improved dynamoelectric machines with insulated electrical interconnections within a stator assembly while reducing end turn pressure forming requirements.

SUMMARY OF THE INVENTION

In carrying out the above-mentioned and other objects of the present invention, methods are disclosed for fabricating dynamoelectric machine stator assemblies. In one disclosed way of carrying out the invention, a plurality of windings comprising coils formed from multiple turns of an electrical conductor are developed and inserted into axially extending slots of a magnetic core with side turn portions of the winding turns disposed within the slots and end turn portions disposed outside the slots and about faces of the core. The core with winding turns therein is then transferred to a station for conditioning the winding end portions or tap wires for interconnection at a common connecting region with lead wires which supply electrical energization power to the windings. Pieces of insulating material are disposed on selected tap wires or winding end portions, and the winding end portions are routed to the common connecting region. The core with winding turns therein is then moved to an end turn pressing station to compress and shape the winding end turns including insulated end portions thereof in accordance with ultimate mounting and application requirements. In addition, in the disclosed embodiment, the winding end turns are simultaneously conditioned to subsequently receive and support an insulating means. In one embodiment, a flat spot or area is formed in the outer periphery of the end turns simultaneously with the compression of the end turns. The magnetic core is then moved to a connection station.

At the connection station, a tap support and aligning means is interfitted with the core and both are positioned relative to a connection apparatus for establishing interconnections among the tap wires and lead wires. In one illustrated embodiment of the invention, the electrical interconnections are established by crimp connecting the appropriate wires while supporting and aligning the wires with the tap support and aligning means. After establishing the interconnections, connection points thereby established are substantially simultaneously insulated by placement in an insulating means or connection insulator. In one illustrated embodiment, each of the connection points are supported and aligned at spaced apart locations conforming to the relative spacing of a plurality of holsters of the connection insulator so that each connection point is received within a corresponding holster substantially simultaneously with the other connection points for electrical isolation and support. The magnetic core and tap wire support and aligning means are then removed from the interfitting relationship. The connection insulator with connection points therein is then moved within the area of the winding end turns conditioned by the end turn press for receiving of the connection insulator. In an illustrated embodiment, tap wires extending from connection points established by electrical interconnection of lead wires with the windings are bent and the connection insulator is positioned within a flat spot or area adjacent the outer periphery of the end turns with a base of the connection insulator being deformed in conformance with the windings. A retaining means such as a tie wrap is then disposed about the connection insulator and end turns to retain the insulator in position for transfer to a lacing station.

At the lacing station, lacing material is disposed about the winding end turns with the connection insulator retained in position adjacent the end turns thereby causing disposition of the lacing material about portions of the connection insulator for securing the connection insulator to the outer periphery of the winding end turns. After the connection insulator has been secured by lacing material, the retaining means is removed with the stator assembly being complete.

In accordance with other aspects of the invention, and as represented by one preferred embodiment described in more detail hereinbelow, a stator assembly embodying the invention in another form includes a connection insulator having a base and a retaining portion comprising a plurality of holsters disposed adjacent the outer periphery of winding end turns, with connection points among the windings and lead wires being retained and supported within respective holsters of the connection insulator. The connection insulator has a base thereof deformed in conformance with the windings and is secured to the winding end turns by lacing material disposed about the periphery of the end turns and the connection insulator.

BRIEF DESCRIPTION OF THE DRAWINGS

Other objects of the present invention and their attendant advantages, will become readily apparent from the following description taken in conjunction with the accompanying figures in which like reference numbers are used to describe like parts throughout the several views, wherein.

DESCRIPTION OF THE PREFERRED EMBODIMENTS

Figure 8:
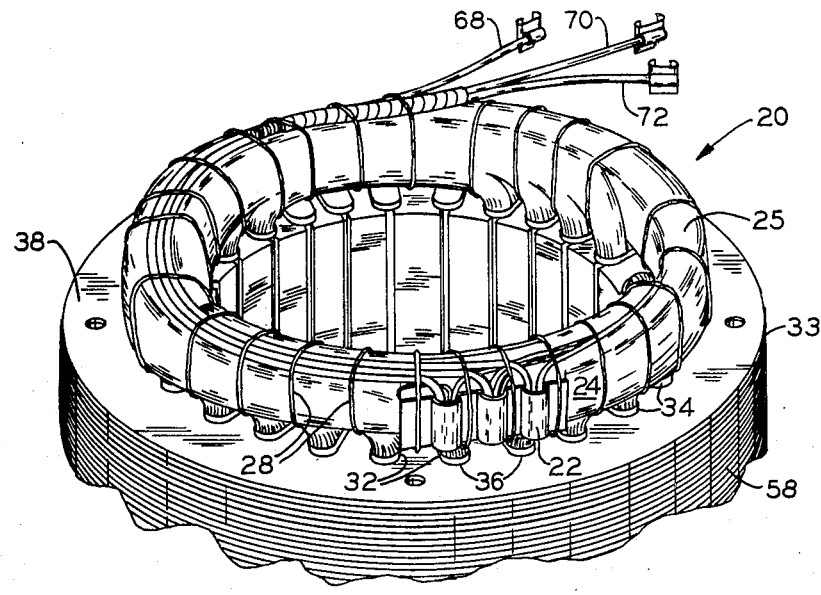
FIG. 8 is a partial perspective view of the stator assembly after completion of a preferred sequence of steps with the connection insulator being retained on the periphery of the winding end turns by lacing material.

A dynamoelectric stator assembly 20 which may be fabricated by methods disclosed herein is illustrated in FIG. 8. As illustrated, the stator assembly is provided with a connection insulator 22 disposed on the outer periphery 24 of winding end turns collectively denoted by reference number 25 which in this particular embodiment as shown more clearly in FIG. 1 comprises main winding end turns 26 and auxiliary or start winding end turns 27. The connection insulator is retained in position by a lacing material 28 disposed about the end turns and the connection insulator.

In fabricating the stator assembly 20, windings comprising multiple turns of an insulated conductor, often referred to as magnet wire, are developed employing known winding techniques and winding machines such as, for example, those disclosed in Mason U.S. Pat. No. 2,934,099 which issued Apr. 26, 1960, or Lauer et al U.S. Pat. No. 3,977,444 which issued Aug. 31, 1976, the entire disclosures of which are herein incorporated by reference. After being developed, the winding turns are inserted into axial extending slots of a magnetic core using conventional injection techniques such as, for example, those disclosed in Hill U.S. Pat. No. 3,324,536 which issued June 13, 1967, or Smith U.S. Pat. No. 3,698,063 which issued Oct. 17, 1972, the entire disclosures of which are incorporated herein by reference. When fabricating a stator assembly having a main and a start winding according to one known approach, the main winding is developed and injected into slots of an insulated core. An insulating material, often referred to as a slot separator, is then inserted within core slots accommodating conductor turns of the main winding. In addition, phase insulation, if used, is disposed about the inner periphery of end turns of the main winding. Auxiliary or start windings are then developed and inserted into preselected core slots using known winding and injecting techniques and machines, with the slot separators being disposed between main winding turns and start winding turns accommodated in the same slot.

Figure 1:
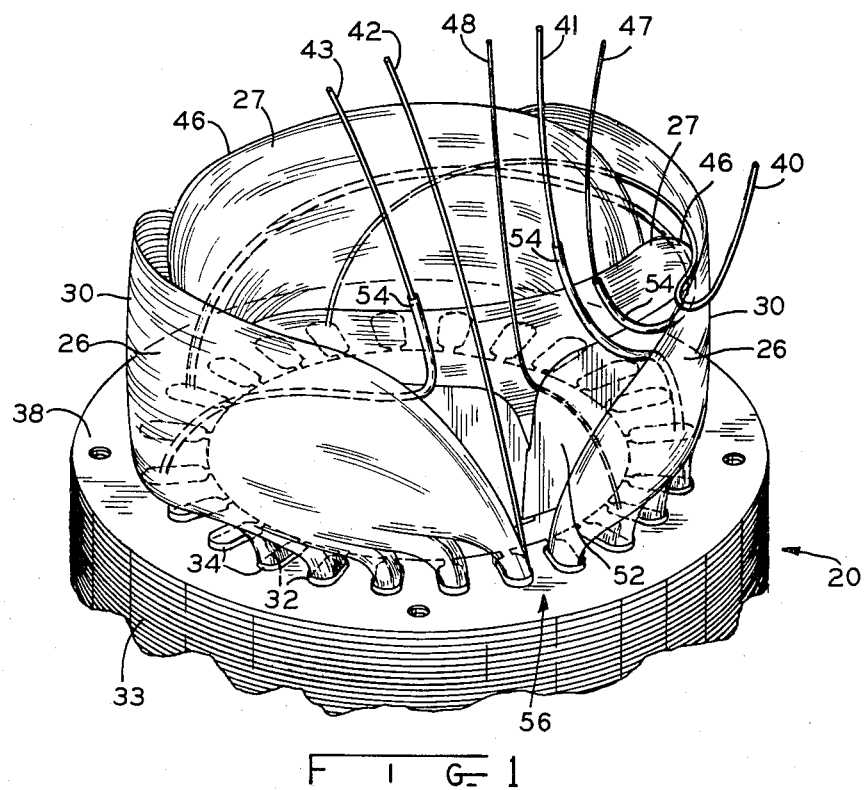
FIG. 1 is a partial perspective view of a stator assembly illustrating winding end turns and tap wires before an end turn pressing operation.
Figure 3:
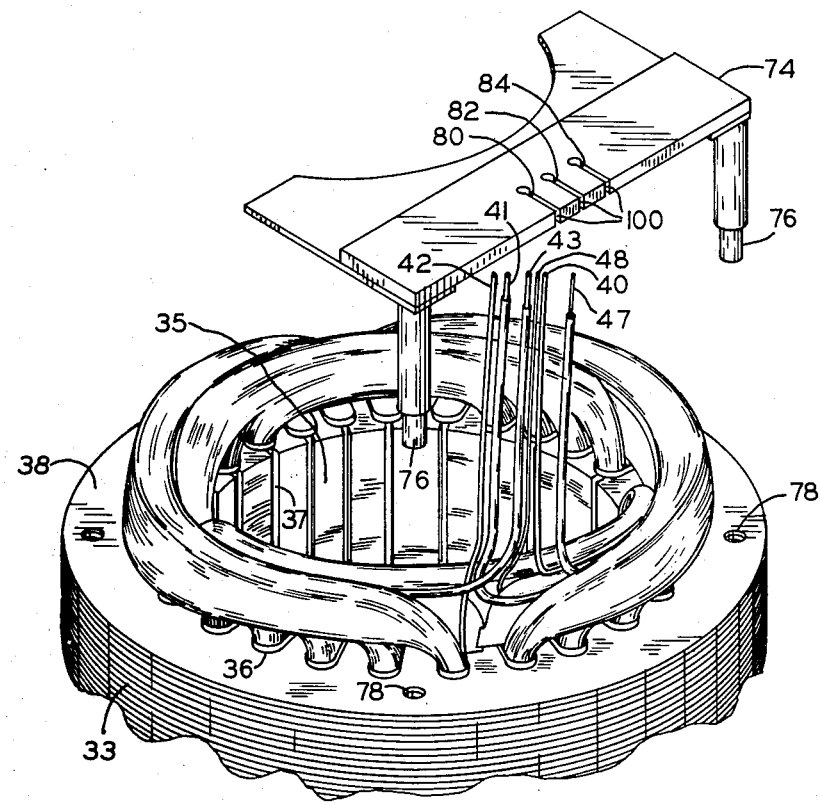
FIG. 3 is a partial perspective view of the stator assembly of FIG. 1 illustrating the interfitting of a tap support and aligning means therewith.

FIG. 1 illustrates the stator assembly 20, at an intermediate point in an assembly operation, that is, after operational steps have been performed on the assembly at a tap wire insulating station for conditioning the assembly for subsequent interconnection of windings and lead wires at a connecting station. As illustrated, the stator assembly includes a main winding 30, formed by conventional winding equipment as described above, having side turn portions thereof (not shown) disposed within longitudinally extending slots 32 of core 33 and insulated from the core by slot insulators 34 as is well known in the art. Referring briefly to FIG. 3, the slots 32 which extend radially from bore 35 of the core 33 to slot closed ends 36 are insulated from the bore by insulating wedges 37 as is also well known in the art. Referring again to FIG. 1, the end turns or end turn portions 26 of the main winding are disposed about or adjacent core face 38 with tap wires or end portions 40–43, extending therefrom. The illustrated stator assembly also includes an auxiliary or start winding 46, formed by known winding equipment, having side turn portions thereof (not shown) disposed within the core slots and the end turn portions 27 disposed about the core face. The start winding is provided with two tap wires 47, 48 extending up through the end turns. In the illustrated embodiment, phase insulation 52 is disposed between the main and start winding end turn portions.

Although preferred forms of the present invention are described herein with reference to a particular two pole stator assembly of the resistance split phase type, it will be understood that the teachings of the present invention may be employed in fabricating stator assemblies with any desired number of poles or of any other type, such as permanent capacitor, capacitor start, capacitor start-capacitor run, resistance start-capacitor run, etc.

In carrying out the invention in one form, the stator assembly 20 is transferred to a winding tap insulating station after the windings having been developed and disposed in the core as illustrated in FIG. 1. Even though conductors employed to fabricate the windings are insulated, additional insulation is preferred on tap wires extending across wires of a different pole or coil group or across wires having substantially higher voltage potential. Thus, additional insulation is provided on tap wires 41, 43, and 47. At the tap wire insulating station, a piece of insulating material such as polyethylene terephthalate is disposed on the designated tap wires in the form of tubes 54, with the tubes being placed over respective tap wires and with the tubes extending to approximately the respective core slots from which the winding taps emanate.

After the designated tap wires have been insulated, all of the tap wires are routed so that the tap wires extend to a common connecting region such as location 56 in the illustrated embodiment which is the "break" point of the main winding.

Figure 2:
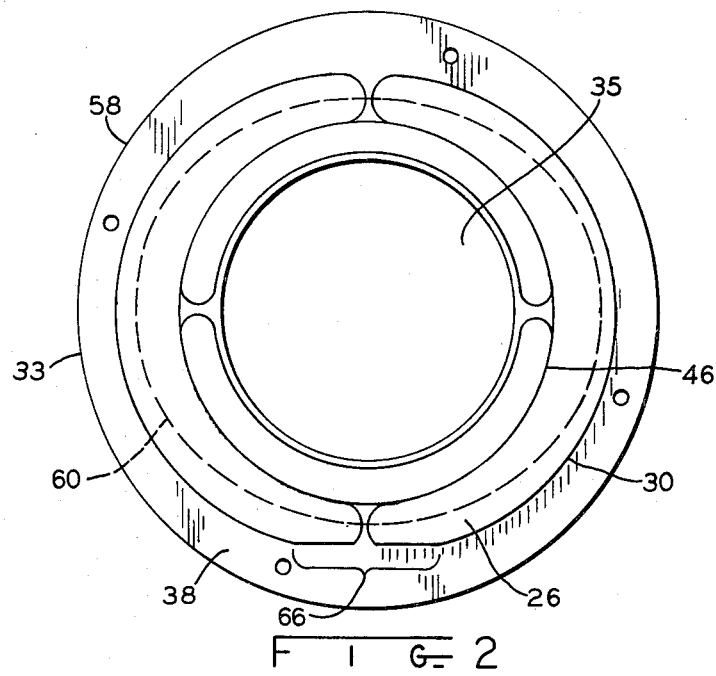
FIG. 2 is a top view of the stator assembly of FIG. 1 illustrating winding end turn configuration before and after the end turn pressing operation.

In order to obtain a desired configuration of end turns of the windings, the stator assembly is moved to an end turn pressing station for applying pressure to the end turns for compressing and shaping the end turns and thus, varying the relative distance between the end turns and the face of the core. FIG. 2 is a top view of the stator assembly illustrating the core 33 having an outer peripheral surface 58 and the configuration of the end turns of the windings about the core face 38 before and after the pressing operation. The dotted line 60 of FIG. 2 illustrates the configuration of the end turns prior to the end turn pressing operation. The end turns of the main winding 30 and the start winding 46 are then pressed into the configuration as shown by solid lines with the end turns disposed about the core face and away from the bore 35 of the core.

As discussed hereinabove, mounting space restrictions on a stator assembly are often very stringent, thus making the final end turn configuration and the space required for making and insulating electrical interconnections with the winding tap wires of extreme importance for many applications. In order to reduce the space required for mounting the connection insulator 22 (shown in FIG. 5 and discussed in detail hereinbelow), the end turn pressing operation preferably includes deformation of a section of the end turns to accommodate the connection insulator. As will be better understood with reference to FIG. 2, a mounting location for the connection insulator is formed during the end turn pressing operation by compressing the outer periphery of the main winding end turns 26, so as to form a compressed section or flat area 66 for subsequently mounting the connection insulator. By forming the flat area, the connection insulator can be mounted within approximately the same area or space as would have been occupied by the end turns absent such compression, thus minimizing mounting space requirements. In addition, by mounting the connection insulator on the periphery of the end turns rather than embedding insulated connections within the end turns, less forming pressure is required in order to obtain the desired end turn configuration which in turn reduces damage to wire insulation during the pressing operation.

The above-described end turn pressing can be performed by known techniques and machines, for example, as taught in Rediger U.S. Pat. No. 2,980,157 which issued Apr. 18, 1961 and Kindig U.S. Pat. No. 3,913,373 which issued Oct. 21, 1975, the entire disclosures of which are incorporated herein by reference. The compressed section 66 can be formed, for example, by employing an insert on one of the outer movable jaws in the apparatus shown in U.S. Pat. No. 2,980,157.

Figure 4:
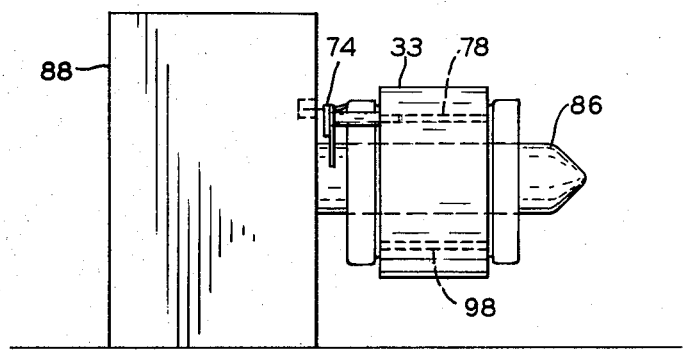
FIG. 4 is a side elevation view of the stator assembly of FIG. 1 with the tap support and aligning means interfitted therewith at a connection station.
Figure 7:
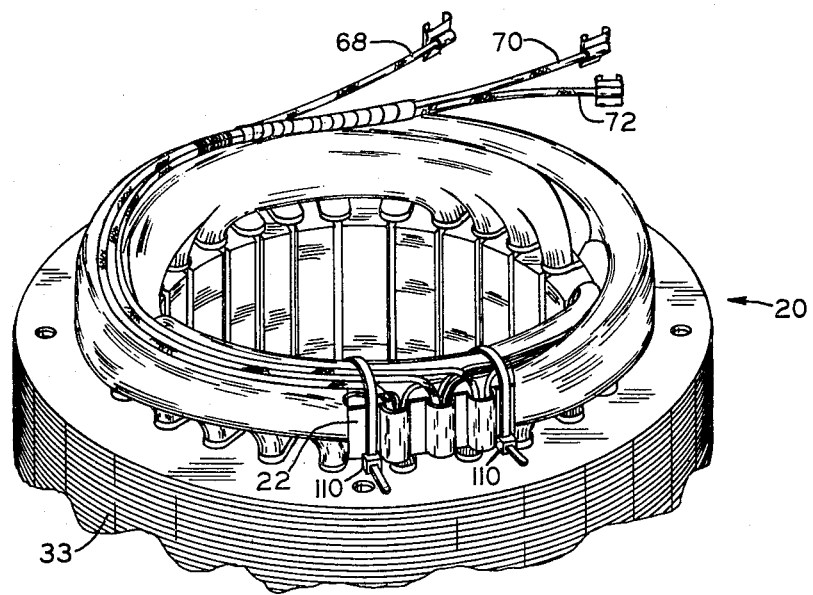
FIG. 7 is a partial perspective view of the stator assembly of FIG. 1 showing the connection insulator being retained for subsequent transfer to a lacing station.

After end turns of the windings have been shaped and compressed at the end turn pressing station, the stator assembly is moved to a connecting station for interconnecting the tap wires of the windings with lead wires 68, 70, and 72 (shown in FIG. 7). At the connecting station (see FIGS. 3 and 4), a tap support and aligning means shown as a holder fixture 74 in the illustrated embodiment is interfitted with the core 33 by disposing two pins 76 thereof within stator core bolt holes 78. The winding end portions or tap wires are placed within the holder fixture slots 80, 82, 84 formed at spaced apart locations on the holder fixture. In the illustrated embodiment, tap wires 41 and 42 are positioned in slot 80, tap wires 40, 43 and 48 in slot 82 and tap wire 47 in slot 84; however, the placement of the tap wires may vary depending upon the particular winding interconnection arrangement. The lead wires 68, 70 and 72, shown in FIG. 7, are each positioned within a respective holder fixture slot. Then, with reference to FIG. 4, the core with the holder fixture interfitted therewith is then horizontally positioned and aligned on a post 86 at a known connecting machine 88, for example, as disclosed in commonly assigned Kindig U.S. Pat. No. 4,035,910 of July 19, 1977, the entire disclosure of which is herein incorporated by reference. In the assembly 20, electrical interconnections between the lead wires and respective tap wires are established by crimping connectors 90 (see FIG. 5) about respective lead and tap wires thereby establishing connection points 92, 94, 96, however, other suitable means may be employed such as, for example, brazing or soldering. Alternatively, the stator core may be postioned at the connecting machine by interfitting pins (not shown) with stator bolt holes such as bolt hole 98. Still further, it is believed by the assignee of the present invention that the holder fixture may be improved by providing the fixture with a pivoting latch member extending over slot entrances 100, thus assuring retention of the wires within the fixture slots 80, 82, 84 during the connecting operation.

Figure 5:
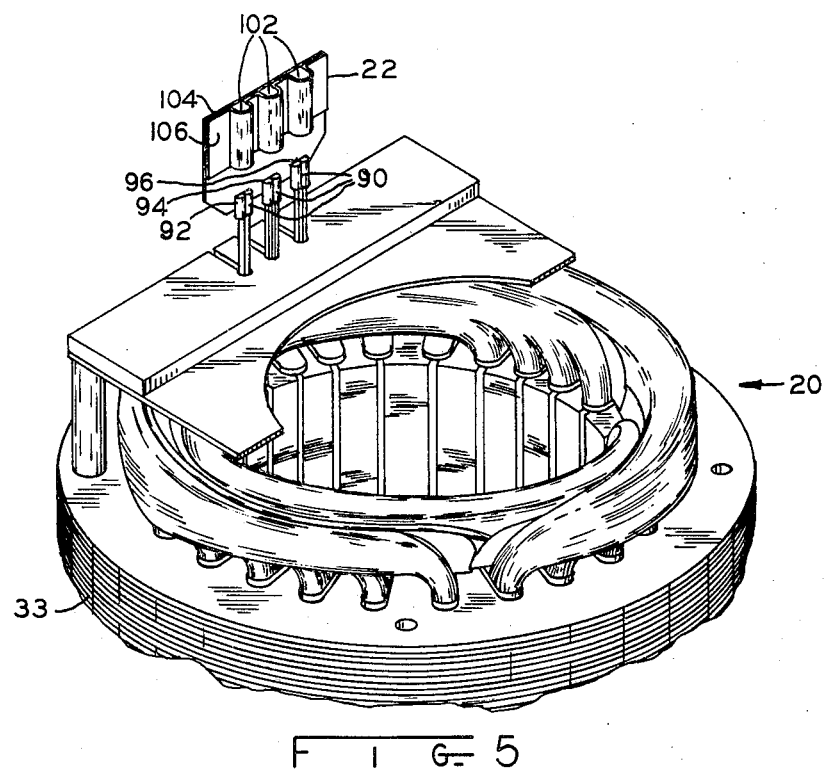
FIG. 5 is a partial perspective view of the stator assembly of FIG. 1 showing a connection insulator being placed over connection points established at the connection station.

After the electrical interconnections between the lead wires and the tap wires have been established, the connection insulator 22 is placed over the connection points 92, 94 and 96 as illustrated in FIG. 5 with each connection point being received substantially simultaneously within holsters or compartments 102. The connection insulator 22 comprises a base 104 and a retaining portion 106 formed in a corrugated configuration. The base and retaining portion are fused (i.e., connected) to each other by ultrasonic welds, thus forming the holsters or compartments with the base establishing one wall of each holster and the retaining portion establishing the semicircular wall of each holster. The base is formed from deformable electrical insulating material such as, for example, the material marketed under the trademark "MYLAR" by the E. I. DuPont de Nemours and Company, and the retaining portion is formed from a somewhat less flexible electrical insulating material such as, for example, a sandwich of material such as MYLAR, NOMEX, MYLAR materials as marketed by DuPont under those names. The illustrated holsters or compartments of the connection insulator have apertures at both ends thereof; however, if desired, the top of the holsters may be partially closed or deformed.

After the connection points have been received within the holsters of the connection insulator, the tap wires and lead wires are removed from the slots 80, 82 and 84 of the holder fixture 74 and the fixture is removed from the interfitting relationship with the core by removing the pins 76 from the bolt holes 78.

Figure 6:
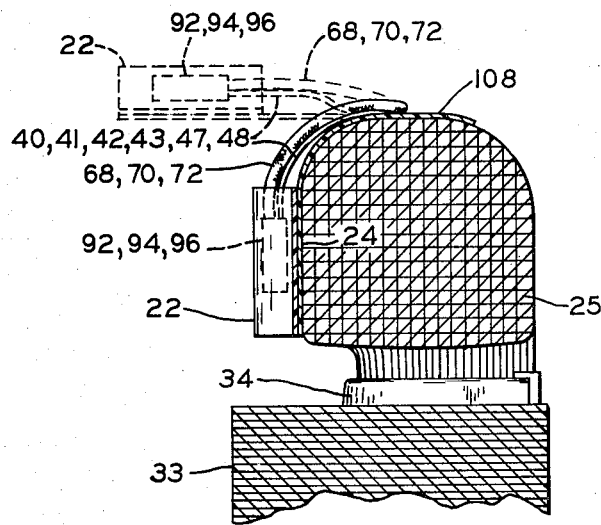
FIG. 6 is a fragmentary side elevational view of the winding end turns showing the connection insulator being moved into position thereon.

Referring now to FIG. 6, after the holder fixture is removed from the core, the connection insulator 22 is in approximately the position as shown by the broken lines with the connection points 92, 94, 96, established by the interconnection of the tap wires 40-43, 47, 48 and the lead wires 68, 70, 72, being retained therein. The tap wires extending from the connection points are bent which has a tendency to facilitate positioning and retaining the connection insulator and the connection insulator is moved to the position as shown by solid lines against the outer periphery 24 of the end turns of the windings within the deformed mounting section 66 as illustrated and discussed in reference to FIG. 2. Tab portion 108 of the insulating connector base is deformed in conformance with the windings, thus providing additional insulation in the connecting region which is especially beneficial to the tap wires not having the insulating tubes thereon and also, aiding retention of the insulator for subsequent operation.

In order to assure retention of the insulating connector in the position as shown in FIG. 6, a retention means illustrated in FIG. 7 as tie wraps 110 is placed around the end turns of the windings and the connection insulator. Two tie wraps are illustrated but one may be sufficient depending upon such factors as the size of the insulator, the insulator flexibility, or number of connection points retained therein. Further, even though the retention means is illustrated as the locking type tie wraps, it is believed that a reusable spring clip may be employed for temporarily retaining the insulator in operations where the connection insulator is to be secured to the windings by a lacing material.

With the connection insulator retained in position on the outer periphery of the end turns, the stator assembly is transferred to a lacing station employing known lacing techniques and machine such as taught, for example, in Gawthrop et al U.S. Pat. No. 3,659,337 of May 2, 1972, the disclosure of which is incorporated herein by reference. At the lacing station, a lacing material or twine 28 is disposed about the end turns of the winding and about the connection insulator 22 thereby securing the connection insulator to the end turns of the windings. The connection insulator 22 is radially located with respect to the core 33 between the outer periphery 58 of the core and the closed ends 36 of the slots 32. The tie wraps may then be severed and removed, thus establishing the stator assembly in its final form as illustrated in FIG. 8.

While the invention has been described in terms of particular embodiments thereof, it should now be apparent that changes may be made without departing from the invention. It is, therefore, intended by the following claims to cover all such variations which are within the true spirit and scope of this invention.

What I claim as new and desire to secure by Letters Patent of the United States is:

1. A dynamoelectric machine stator assembly comprising: a magnetic core having an outer periphery, a bore, and longitudinally extending slots that extend radially from the bore to closed ends proximate to the outer periphery of the core; at least one winding having side turn portions thereof disposed within the core slots and end turn portions thereof disposed about at least one core face; portions of some of said end turns being in a compressed and shaped condition so as to establish a flattened region defining a predetermined space unoccupied by said end turns; the at least one winding having at least two tap wires extending from the end turn portions to a common connecting region near said flattened region; at least two lead wires each connected to at least one respective tap wire thereby establishing respective connection points; a connection insulator formed from at least one piece of sheet material electrical insulating material and having a sheet material base portion deformed into conformity with the windings and having a plurality of holsters, said connection insulator being disposed in the predetermined space adjacent the outer periphery of the end turn portions at the common connecting region adjacent to said flattened region, with said sheet material base portion conformed in shape to the contour of the end turn portions; said connection points being disposed within respective holsters of the connection insulator; and said connection insulator being retained in position on the outer periphery of the end turn portions and located radially with respect to the core between the outer periphery of the core and the closed ends of the slots.

2. The dynamoelectric machine stator assembly of claim 1 wherein the connection insulator includes a retaining portion fused to the base of the connection insulator.

3. The dynamoelectric machine stator assembly of claim 1 wherein each holster comprises a compartment having apertures at both ends thereof with one wall of said compartment established by the base of the connection insulator and another wall thereof established by a retaining portion of the connection insulator.

* * * * *